Figure 1:
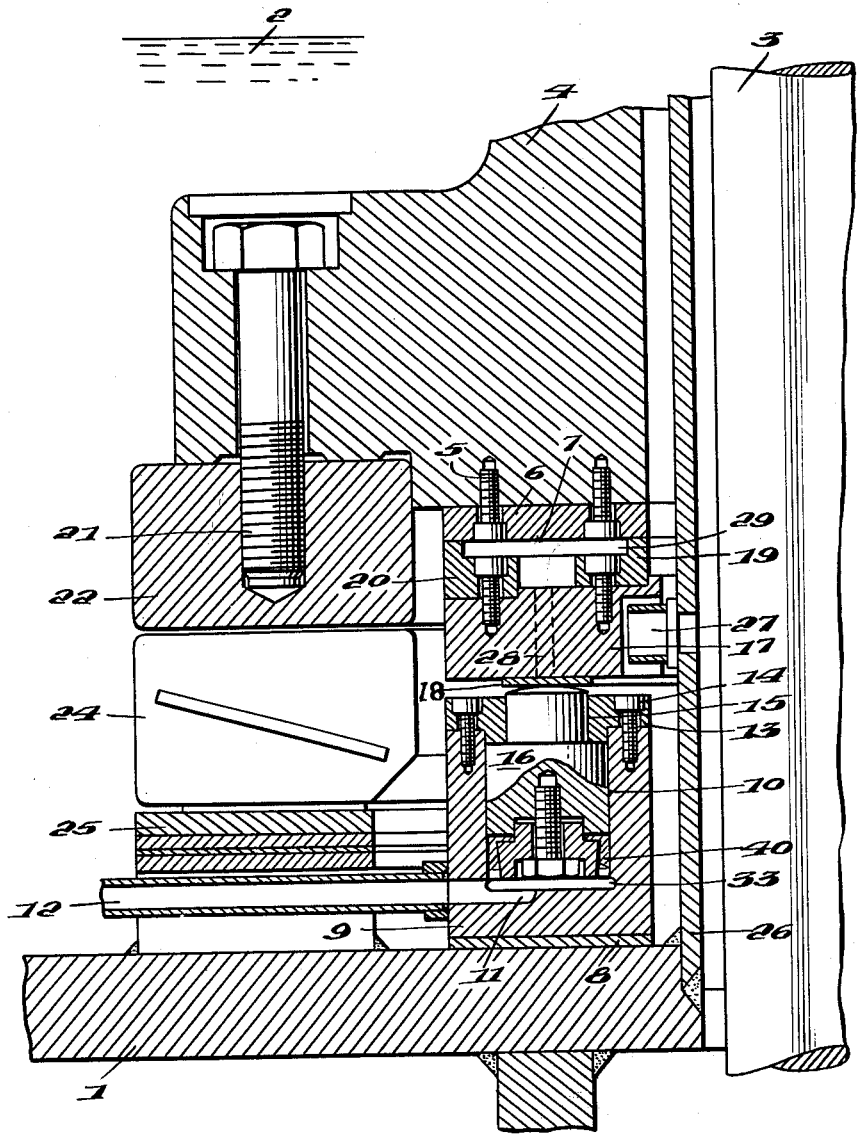

Jan. 12, 1965  E. WIEDEMANN ETAL  3,165,365
BEARING ARRANGEMENT FOR VERTICAL SHAFTS
Filed Dec. 3, 1962  2 Sheets-Sheet 1

INVENTORS
Eugen Wiedemann
Robert Cuny
BY
Pierce, Scheffler & Parker
ATTORNEYS

United States Patent Office 3,165,365
Patented Jan. 12, 1965

3,165,365
BEARING ARRANGEMENT FOR
VERTICAL SHAFTS
Eugen Wiedemann, Baden, and Robert Heinrich Cuny, Wettingen, Aargau, Switzerland, assignors to Aktiengesellschaft Brown, Boveri & Cie, Baden, Switzerland, a joint-stock company
Filed Dec. 3, 1962, Ser. No. 241,697
Claims priority, application Switzerland Dec. 5, 1961
9 Claims. (Cl. 308—170)

The present invention relates to a bearing arrangement for vertical shafts and in particular for large generator shafts in hydro power stations.

With the known designs the rotors of large vertical generators turn usually on segmental hydrodynamic bearings which surround the vertical shaft and carry the weight of the shaft and the rotor. The working security of this type of bearing is very high in that there is very little chance of bearing failure. On the other hand they display the disadvantage of high friction losses. In order to reduce these losses, designs featuring magnetic bearing relief have made their appearance. With this system the rotor is raised from the segmental bearing by means of a hub magnet and pressed against a small-dimensioned backing bearing, whereby the loading on this backing bearing is considerably smaller than that acting on the segmental bearing without this arrangement. Magnetic bearing relief arrangements of this type, however, are very expensive. The expenditure is limited not only to the provision of a powerful hub magnet but additionally arises as a result of the various arrangements for controlling the exciting current which must be varied in relation to the bearing load, which is in itself a function of the turbine output.

Yet other designs have become known with which hydrostatic pressure oil bearings are employed instead of hydrodynamic bearings i.e. segmental bearings; these pressure oil bearings present considerably lower friction losses, but possess, however, practically no running security in case of emergency. Thus, in order to avoid heavy damage on failure of the pressure-oil pump, a reserve pump connected with a pressure storage vessel and an oil quantity regulator has up till now been provided.

Yet another design has become known with which the hydrostatic bearing is combined with a roller bearing, whereby the roller bearing serves as an emergency bearing and replaces the emergency-running characteristic lacking in the hydrostatic bearing. Roller or wheel bearings of this type, however, can at the same time serve only as an emergency bearing for the period when the rotor runs down and a continuous operation with these bearings is not possible.

The present invention has for its object to provide a bearing arrangement which displays low friction losses in normal running and enables continuous operation during emergency running.

The bearing arrangement according to the invention is characterized by a combination of a hydrostatic normal-service bearing and a hydrodynamic emergency-running bearing.

In normal operation, load is carried by the hydrostatic bearing and conversely the hydrodynamic bearing only accepts load when the hydrostatic bearing for any reason is not longer able to accept load, e.g. on failure of the pressure-oil pump. In contrast to the designs recognized up to the present it is not necessary when employing the bearing arrangement according to the invention, to interrupt the generator operation because of bearing trouble. This is due to the hydrodynamic bearing accepting load when the hydrostatic one becomes defective, the former operating probably with smaller efficiency as its friction losses are about five times as great as those of the hydrostatic bearing, but nonetheless guaranteeing unlimited further operation of the generator.

Figure 2:
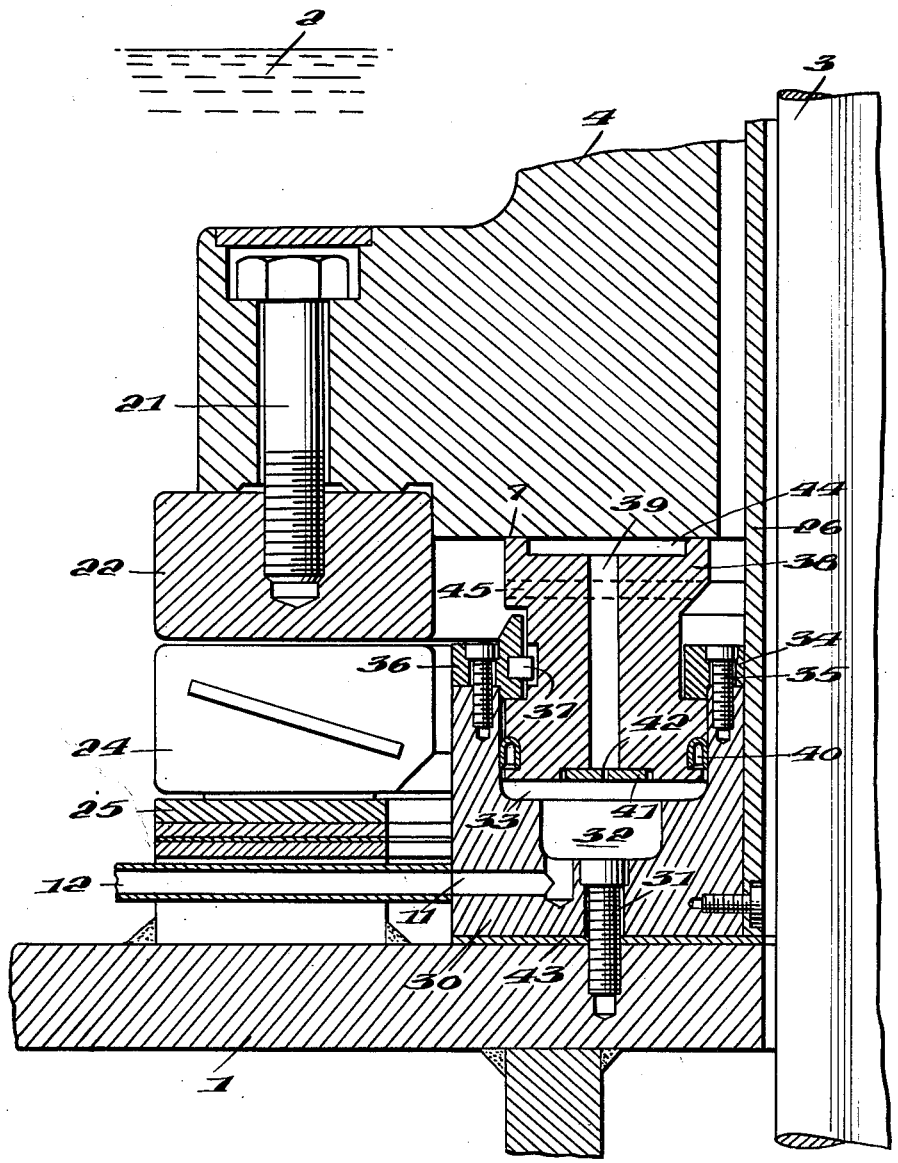

The foregoing as well as other objects and advantages inherent in the invention will become more apparent from the following detailed description of two embodiments thereof and from the accompanying drawings wherein:

FIG. 1 is a view in axial cross section through the bearing of a large generator; and FIG. 2 is a view similar to FIG. 1 but showing a modification of certain component parts thereof:

With reference now to the embodiment shown in FIG. 1, a bearing spider 1 form the base of an oil reservoir the level of which being indicated with 2. A bearing head 4 is attached to a vertical shaft 3 of a generator to the undersurface of which head is bolted a bearing race 6 of the hydrostatic bearing. Its bearing surfaces are designated with 7.

Insulating rings 8 are seated on the bearing spider 1 and these insulate cylinders 9 distributed around the circumference from bearing spider 1. Each of the cylinders 9 is firmly bolted to the bearing spider 1 by means of two flanges cast on in the peripheral direction (not represented). Cylinders 9 are provided with piston-bores 10, as well as lateral pressure-oil borings 11. Each cylinder 9 possesses a connection 12 leading into main chambers 33 via pressure-oil boring 11. Cylinders 9 are covered in by means of cylinder covers 13, the latter being fixed in place with bolts 14. The covers include a boring 15 through which the ends of load pistons 16, which are fitted with glands 40, project upwards. Load pistons 16 are crowned at their upper ends. A supporting ring 17 serves to mount two concentrically arranged bearings rings 19 and 20 which are fixed to supporting ring 17 by means of bolts 21. An intermediate ring 18 is fixed to the underside of the supporting ring. As can be seen from FIG. 1, surfaces 7 represent the hydrostatic bearing areas between the rotating upper part of the generator and the stationary lower part.

Concentrically with this hydrostatic bearing and surrounding it is arranged a so-called hydrodynamic or segmental bearing; the rotating race 22 of the latter is fixed to bearing head 4 by means of bolts while the corresponding stationary segments 24 are held in a segmental bearing holding ring 25. This holding ring 25 is connected with bearing spider 1 through an intermediate ring to which both are welded. Plug 27 is seated in a vertical cylindrical inner wall 26, the former protruding into a hole in the supporting ring 17. Supporting ring 17 furthermore includes a boring 28 through which pressure-oil is introduced into an annular chamber 29 for bearing pressure-oil. Boring 28 is located, in a circumferential direction, between two of the load pistons 16 and pressure-oil is supplied to the inlet end of the boring by means of a flexible, pressure-tight metal piping.

As that part of the bearing spider 1 which supports both bearings is formed as an oil container, both bearings run in oil. On transferring the load from the hydrostatic bearing to the hydrodynamic segmental bearing it is thus ensured that a film of lubricant capable of supporting the load appears immediately between the bearing surfaces. In normal operation, the hydrostatic bearing supports the load and race 22 of the segmental bearing is raised up from segments 24 with a gap of about 3 mm.

With the design as represented in FIG. 1 the oil film which bears the load for the hydrostatic bearing lies between rings 6, 19 and 20 or, respectively, between both bearing surfaces 7 of these components. In operation, pressure oil is pumped through connections 12 and pressure oil borings 11 into the main chambers 33 of cylinders 9, this raising load pistons 16 till the shoulders of the latter abut against cylinder covers 13. Glands 40 mounted at the load pistons 16 prevent oil-leakage losses. By means of load pistons 16 distributed equally over the circumference of bearing head 4 the fixed supporting ring is raised by the intermediate ring 18, taking with it the bearing rings 19 and 20, and thus the entire rotating part of the generator. Plug 27 prevents the rotation of supporting ring 17, allowing however axial movement of the latter corresponding to the stroke of load pistons 16.

Through borings 28 pressure oil is fed to the annular chambers 29 for bearing pressure oil, this appearing between both bearing surfaces 7 of the fixed bearing rings 19 and 20 and of the rotating race 6 of the hydrostatic bearing. The oil, heated by friction and flowing off between bearing surfaces 7 to the outside, travels partly through the gaps between race 22 and segments 24 of the segmental bearing and arrives at the outside, where it is again mixed with the colder oil in the oil container.

The required pressure of the pressure oil being fed through connections 12 is dependent on the number of load pistons 16 and their hydrostatically loaded surfaces, as well as on the total weight of the masses to be raised. With the size relationships as are for example shown in FIG. 1, this oil pressure must be considerably greater than the pressure in the annular chambers 29 for the bearing pressure-oil, in order that the hydrostatic bearing can be raised.

The rotating part of the generator thus runs in normal operation on bearing surfaces 7 while the segmental bearing is completely unloaded. The losses arising due to the movement of the oil in the gaps of the segmental bearing are thus very small and can, as in the present case, be even further diminished by feeding the pressure oil heated in the hydrostatic bearing into the free-running segmental bearing. Due to the concentric external arrangement of the segmental bearing, the oil flow can be adjusted in the desired direction. The pressure of the oil to be produced by the pump is of the order of 100 atmospheres.

With decreasing oil pressure, load pistons 16 sink and with them the hydrostatic bearing complete with the rotating part of the generator. At the same time the gaps between race 22 and segments 24 decrease and the segmental bearing takes up the load directly. In this manner damage to the bearing surfaces 7 of the hydrostatic bearing is avoided. While the rotating part of the generator is supported on the segmental bearing, the stationary part of the hydrostatic bearing sinks further and there is formed a gap between the bearing surfaces 7 of the latter, which avoids the occurrence of high friction losses.

In FIG. 2 is represented another embodiment; the construction of the latter is similar to that of FIG. 1 and similar components are designated with the same reference symbols. With the FIG. 2 embodiment, however, separate load pistons are not arranged, this being more fully detailed in the following description. An annular cylinder 30 is attached to the bearing spider 1 by means of bolts 31 and seated on an insulating ring 43 arranged concentrically to the generator shaft 3. This annular cylinder 30 includes an annular auxiliary chamber 32 as well as a similar main chamber 33. It is closed off at the top by two ring covers 34 and 36. The ring cover 36 is provided with keys 37 which are located in a longitudinal groove in annular piston 38. Gland rings 40 which are fixed in the annular piston 38 prevent oil-leakage losses. Annular piston 38 possesses at least one boring 39 at the entrance to which is mounted an orifice plate 41 with an opening 42; it has additionally borings 45 which serve for the oil return. The borings 45 enable the oil which flows radially inwards from the annular chamber 44 towards shaft 3, to return to the oil reservoir. Without such borings, the oil would be trapped between the bearing head 4 and the inner cylinder wall 26 would rise to a level where it would then flow away between the inner wall and shaft 3 and would be lost.

Also, with the FIG. 2 embodiment the hydrostatic bearing arranged close by the shaft serves as the main bearing. In operation the pressure oil travels through connections 12 and boring 11 over the auxiliary chamber 32 into the main chamber 33 and raises the annular piston 38 along with the rotating bearing component of the generator. The movement of annular piston 38 is continued till its collar abuts against the ring covers 34 and 36. On completion of this stroke there is present, between segments 24 and race 22 of the segmental bearing, a gap of about 3 mm. width.

From the main chamber 33 fresh oil travels through the opening 42 of the orifice 41 and the boring 39 into the annular chamber 44 for the bearing pressure oil from which point it flows out between the bearing surfaces 7. Also with this design the friction losses in the running segmental bearing are very small, due to the reasons already mentioned.

With the construction as represented in FIG. 2 the pressure oil serving to lubricate the hydrostatic bearing accomplishes at the same time the raising of the rotor.

The underfaces of the annular piston 38 are so dimensioned that on them results a force acting upwards as soon as pressure oil is supplied and once the corresponding pressure has built up in the main chamber 33. The magnitude of this force is adjusted with the aid of the orifice 21 or, respectively, its opening 42 in the required range as through this the desired pressure difference between main chamber 33 and annular chamber 44 can be produced. Thus, the safe raising of annular piston 38 during the pressure build-up at pump start-up is guaranteed.

The keys 37 prevent the simultaneous rotation of the annular piston 38. This annular piston 38 is built into the annular cylinder 30 with a large play in order to prevent the latter from seizing. The two gland rings 40 assure that, nonetheless, practically no leakage oil losses arise. The embodiment as represented in FIG. 2 functions fundamentally in exactly the same manner as the embodiment shown in FIG. 1. With each embodiment the segmental journal bearing does not represent a so-called emergency bearing which serves only to avoid more extensive breakdowns in the machine groups but rather can run continually for any desired length of time, i.e. till the shutting-off of the group is justified.

The rather more complicated design of a second, completely serviceable bearing in the form of a segmental bearing can also be advocated on financial grounds. The hydrostatic main bearing displays losses, inclusive of the ancillary high-pressure oil pump, amounting altogether to about only half the losses of the corresponding segmental bearing, the friction losses of which can, for example, be of the order of 200 kw.

In conclusion, the bearing arrangement according to the invention, with special regard to generators for hydro-electric stations, allows operation with lower losses than formerly and thus, with unimpaired running security, the attainment of higher efficiencies, this having especially strong effects on part load. At the same time it should be specially stressed that the improvement in efficiency is not obtained at the expense of the working security, but conversely the latter is increased further with the bearing arrangement as according to the invention.

We claim:

1. In a bearing structure for supporting a vertically disposed rotatable shaft, the combination comprising a normal service hydrostatic bearing means having a lower annular non-rotatable bearing member surrounding a shaft and which coacts through a pressurized lubricant film with an upper annular rotary bearing member surrounding and secured to said shaft, and an emergency service hydrodynamic bearing having a lower circular array of circumferentially spaced stationary bearing segments surrounding said shaft and an upper annular rotary bearing member surrounding and secured to said shaft, said hydrostatic bearing means alone serving to carry the shaft load during normal service, and said hydrodynamic bearing taking over the load only upon a failure of said hydrostatic bearing means and a resulting lowering of said shaft so as to bring said upper and lower bearing elements of said hydrodynamic bearing into load supporting relationship.

2. A bearing structure for vertical shafts as defined in claim 1 and wherein said hydrodynamic bearing is located radially outward from said hydrostatic bearing means.

3. A bearing structure for vertical shafts as defined in claim 1 and wherein said non-rotatable bearing member of said hydrostatic bearing means is constituted by two concentric rings.

4. A bearing structure for vertical shafts as defined in claim 1 wherein said non-rotatable bearing member of said hydrostatic bearing means is axially displaceable.

5. A bearing structure for vertical shafts as defined in claim 1 in which said hydrostatic bearing means includes means for raising the hydrostatic bearing surface of said hydrostatic bearing means for the purpose of adjusting the vertical gap between the upper and lower bearing members of said hydrodynamic bearing.

6. A bearing structure for vertical shafts as defined in claim 1 in which said hydrostatic bearing means includes a plurality of circumferentially spaced cylinders surrounding said shaft below said non-rotatable bearing member and pressure actuated load pistons in said cylinders for applying a lifting force to said non-rotatable bearing member thereby to raise the hydrostatic bearing surface of said hydrostatic bearing means and adjust the gap between the upper and lower bearing members of said hydrodynamic bearing.

7. A bearing structure for vertical shafts as defined in claim 1 in which said hydrostatic bearing means includes an annular cylinder surrounding said shaft and an annular fluid actuated piston in said cylinder for applying a lifting force to raise the hydrostatic bearing surfaces of said hydrostatic bearing means and adjust the gap between the upper and lower bearing members of said hydrodynamic bearing.

8. A bearing structure for vertical shafts as defined in claim 1 wherein said lower bearing member of said hydrostatic bearing means is constituted by an annular piston operable within an annular cylinder surrounding said shaft, said annular piston being fluid actuated to effect a rise in the hydrostatic bearing means of said hydrostatic bearing means to adjust the gap between the upper and lower bearing members of said hydrodynamic bearing.

9. A bearing structure for vertical shafts as defined in claim 8 wherein the interior of said annular cylinder below said annular piston is connected via an orifice controlled passageway extending upwardly through said annular piston in order to supply a pressurized lubricant film to the hydrostatic bearing surfaces.

References Cited in the file of this patent

UNITED STATES PATENTS

| | | |
|---|---|---|
| 1,117,504 | Kingsbury | Nov. 17, 1914 |
| 1,441,614 | Wadsworth | Jan. 9, 1923 |
| 2,800,375 | Heer | July 23, 1957 |
| 2,937,294 | Macks | May 17, 1960 |